(12) United States Patent
Chan

(10) Patent No.: US 7,610,412 B2
(45) Date of Patent: Oct. 27, 2009

(54) THROTTLING COMMUNICATION BETWEEN SOFTWARE PROCESSES

(75) Inventor: Peter Chan, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 11/582,068

(22) Filed: Oct. 17, 2006

(65) Prior Publication Data

US 2008/0091860 A1  Apr. 17, 2008

(51) Int. Cl.
G06F 3/00 (2006.01)
(52) U.S. Cl. .................. 710/29; 710/106; 709/233; 709/237; 370/232
(58) Field of Classification Search .............. 710/29, 710/106; 709/233, 237; 370/219, 232, 276, 370/352, 445
See application file for complete search history.

(56) References Cited

U.S. PATENT DOCUMENTS

| | | | | |
|---|---|---|---|---|
| 5,903,547 | A * | 5/1999 | Shimokasa | 370/232 |
| 6,542,942 | B1 * | 4/2003 | Gulati et al. | 710/31 |
| 6,748,445 | B1 * | 6/2004 | Darcy et al. | 709/237 |
| 6,791,940 | B1 * | 9/2004 | Rajesh | 370/219 |
| 6,856,613 | B1 * | 2/2005 | Murphy | 370/352 |
| 6,865,624 | B2 * | 3/2005 | Gulati et al. | 710/31 |
| 7,110,418 | B2 * | 9/2006 | Attimont et al. | 370/445 |
| 7,181,528 | B2 * | 2/2007 | Darcy et al. | 709/237 |
| 7,231,455 | B2 * | 6/2007 | Marejka et al. | 709/233 |
| 7,231,457 | B2 * | 6/2007 | Darcy et al. | 709/237 |
| 2004/0027997 | A1 * | 2/2004 | Terry et al. | 370/276 |

OTHER PUBLICATIONS

Seelam et al. Throttling I/O Streams to Accelerate File-IO Performance. The University of Texas at El Paso. Spring-Verlag Berlin Heidelberg. 2007.*
Miller et al. Data Distribution Over IP in High Error Rate Military Radio Environments. IEEE. 1998.*
Park et al. Data Throttling for Data-Intensive Workflows. Department of Computer Science, University of Virginia. Preliminary Version. Proceedings of 2008 International Parallel and Distributed Processing Symposium. Apr. 14-18, 2008.*

* cited by examiner

Primary Examiner—Mark Rinehart
Assistant Examiner—Matthew D Spittle

(57) ABSTRACT

A throttling process for throttling communications between software processes, where data streams are sent between a source and one or more destinations. The method first determines if any of the destinations are busy. If one or more of the destinations are busy, the process performs a throttling action before sending the data stream to the busy destinations.

26 Claims, 2 Drawing Sheets

THROTTLING COMMUNICATION BETWEEN SOFTWARE PROCESSES

BACKGROUND

Various systems employ software communications where a particular source sends information or data to one or more destinations. For example, network systems typically employ a server that sends data to and receives data from a plurality of work stations. The network system may include a switch router having a master processor and a plurality of slave processors that communicate with each other through various software communication processes. The master processor and the slave processors would have predetermined functions, where the master processor controls the operation of the slave processors, as is well understood to those skilled in the art. Typically, the master processor and the slave processors will be operating at the same speed. However, during certain times, depending on the flow of data between the server and the stations, one or more of the slave processors may be receiving communications from the master processor at such a high rate that the slave processor is unable to act on the communications quickly enough. Such an occurrence may result in information or data being lost or dropped, where the master processor will have to resend the data to the slave processor. In other words, if the slave processor is overwhelmed with data communications from the master processor, it is likely that some of the data will be dropped.

Typical communications between the processors, such as those using the TCP, result in a hand shaking procedure where the slave processors acknowledge through a return transmission that they either received or did not receive the particular data stream, where it would need to be resent if it was not received. However, by requiring the slave processors to send return messages back to the master processor, and have the master processor resend the data that has already been transmitted, an even higher increase in the flow of traffic between the master processor and the slave processors occurs, resulting in more congestion and more dropped data. Further, the slave processors may have to ask the master processor to stop sending data for some period of time, which also creates more system traffic. Also, it is possible that with too much data being sent between the master processor and the slave processors, the master processor and a slave processor may get into an inconsistent state, where they are out of sync with each other resulting in more serious network traffic flow problems.

DETAILED DESCRIPTION OF THE EMBODIMENTS

Figure 1:
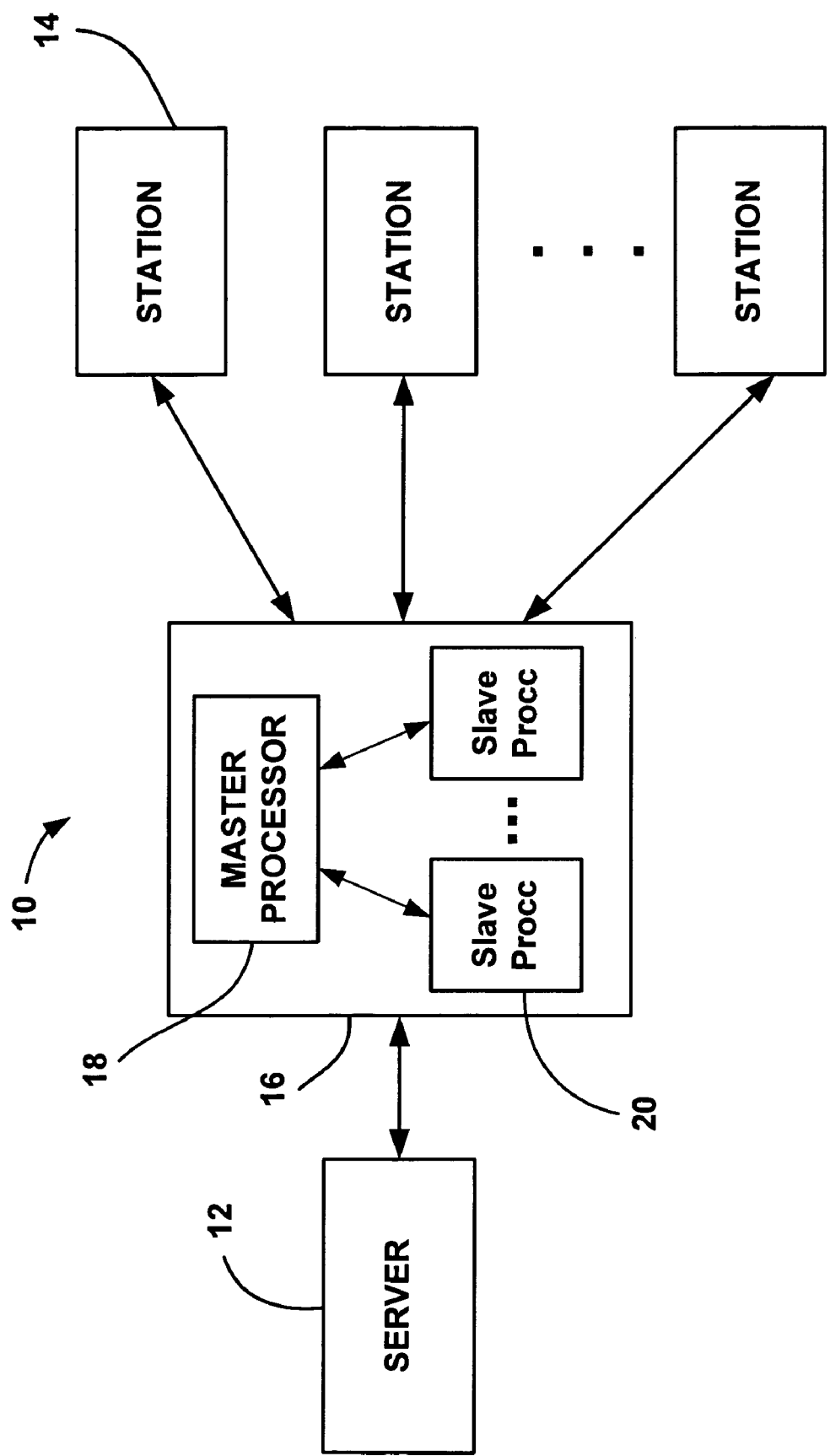
FIG. 1 is a block diagram of a network system.

FIG. 1 is a general block diagram of a network system 10 including a server 12 and work stations 14. Files are sent back and forth between the server 12 and the stations 14. A particular station 14 may request a file from the server 12. The server 12 will send the file to the station 14 through a switch router 16 using an identification number to identify the station 14. The transfer of files, data and other information between the server 12 and the stations 14 may be controlled by a transmission control protocol (TCP). The switch router 16 includes a master processor 18 and a plurality of slave processors 20 that communicate with each other through various software communication processes.

Figure 2:
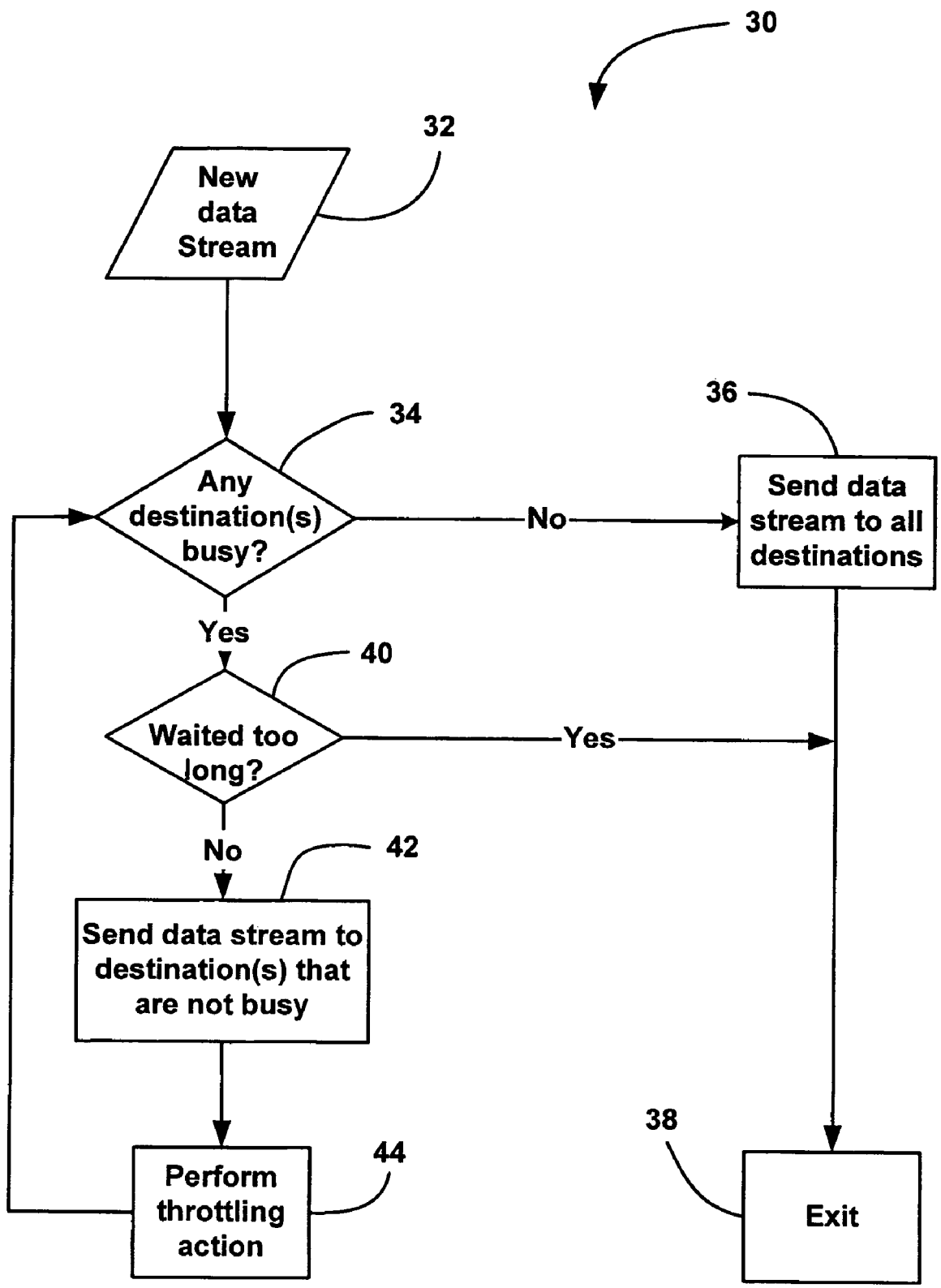
FIG. 2 is a flow chart diagram showing a throttling process for reducing network traffic.

FIG. 2 is a flow chart diagram 30 showing the operation of an algorithm for performing a throttling process for data software communications between the master processor 18 and the slave processors 20. As mentioned above, the throttling process of the invention will have much wider applications beyond the specific example given herein. At box 32, a new stream of data is being sent from the master processor 18 to one or more of the slave processors 20. The algorithm performing the throttling process is a software application running in the master processor 18.

The algorithm determines whether any of the destinations, i.e., the slave processors 20, are busy at decision diamond 34. The algorithm for performing the throttling process of the invention is application specific in that it can be designed and written to determine whether a destination is busy by any suitable manner. For example, in one non-limiting embodiment, the algorithm determines whether a destination is busy by looking at the current usage level of a central processing unit (CPU) operating in the destination. In one non-limiting example, if the algorithm determines that the CPU usage level is 80% or above, then the algorithm determines that that destination is busy. Further, the algorithm can determine whether the CPU operating in the master processor 18 is above a predetermined usage percentage, and it can be the combination of the usage of the two CPUs that determines that the destination is busy. Current router designs that include a master processor and slave processors typically include tables running within the master processor that determines the usage level of the CPUs in the slave processors. Therefore, access to that information is readily available.

Other throttling algorithms can use other information to determine whether a particular destination is busy. For example, the algorithm can determine how many processes the destination is current calculating. The user can customize how the algorithm determines whether a destination is busy or use a predetermined default process for determining if a destination is busy.

If the algorithm determines that none of the destinations are busy at the decision diamond 34, then the algorithm proceeds to send the data stream to all of the destinations at box 36. The algorithm then exits the throttling process at box 38, and waits for a new data stream to be sent at box 32.

If the algorithm determines that one or more of the destinations are busy at the decision diamond 34, then the algorithm will determine whether it has been waiting too long to send the data stream to the busy destinations at decision diamond 40. Particularly, each time the algorithm cycles through the process and determines that a particular destination has been busy for that particular data stream, and a predetermined count or time period has been reached, the algorithm will decide it has waited too long to send the data stream to the busy destination, and will exit the algorithm at the box 38 to wait for a new data stream at the box 32. In this case, the data is dropped. If the algorithm determines that the wait time has not been too long at the decision diamond 40, it will send the data stream to those destinations that are currently not busy at box 42. The wait too long time can be user specified or a predetermined default time can be used.

The algorithm will then perform a throttling action at box 44 for sending the data stream to the busy destinations. The throttling action can be user specified where any suitable throttling action can be performed to send the data to the busy destinations. Also, the user can use a predetermined default throttling process. In one embodiment, the throttling action waits for a predetermined period of time, such as twenty milliseconds, and then returns to the decision diamond 34 to determine if the busy destinations from the previous cycle are still busy based on the predetermined criteria, as discussed above. In an alternate embodiment, the throttling action can first determine whether the data stream being sent is important enough, and if not, immediately exit the algorithm, or if it is important enough, then go through the waiting period. In an alternate embodiment, the throttling action can send the data at a slower speed.

If one or more of the destinations are still busy, a counter is accumulated at the decision diamond 40 to determine if the throttling process is waiting too long, as discussed above. Because the algorithm sends the data stream to the destinations at the box 42 before it is possible for the algorithm to have waited too long at the decision diamond 40, only the data stream for those destinations that are busy will be lost. By including the wait too long decision, the algorithm will not go into a continuous loop because it checks to see if the same destination is continuously busy for the same data stream.

The throttling algorithm discussed above is for a single data stream that is sent to a particular group of destinations. At the same time that the algorithm is performing the throttling process for that data stream it can also be performing another throttling process for a different data stream that may have different processing requirements. For example, the decision to determine whether the destinations are busy can be different, such as using a different CPU usage level. Further, the throttling action at the box 44 can be different, such as using a different time delay period. Therefore, the throttling algorithm of the invention can be customized to a particular system or a particular software application to reduce communications traffic.

The discussion above for the throttling algorithm is for software communications between internal processors of a device. The throttling algorithm can also be used on a larger scale. For example, a satellite may be sending data communications signals to various home stations on the earth in a larger network system. The throttling algorithm can be used to increase the likelihood that the data signals will be received by the home stations in the manner discussed above.

The advantages of the throttling algorithm can be seen because the detection of the busy destinations, the action taken for a busy destination and the "wait too long" time can be user defined. Alternately, the throttle detection, the throttle action and the wait too long time can have predetermined default behaviors. Thus, a user may use the process of the invention with minimal customization or any suitable amount of customization for a particular application.

The foregoing discussion discloses and describes merely exemplary embodiments. One skilled in the art will readily recognize from such discussion, and from the accompanying drawings and claims, that various changes, modifications or variations can be made therein without departing from the spirit and scope of the embodiments as defined in the following claims.

What is claimed is:

1. A method for controlling a stream of data sent from a source to a plurality of destinations, said method comprising:
   selecting which of the plurality of destinations a particular data stream is to be sent;
   determining if one or more of the selected destinations are busy;
   responsive to a determination that at least one of the selected destinations is not busy, sending the particular data stream to those selected destinations that are not busy; and
   responsive to a determination that at least one of the selected destinations is busy, performing a throttling action for the particular data stream being sent to the busy destination so as to reduce the chance that the data stream will be dropped.

2. The method according to claim 1 further comprising determining whether the throttling action has attempted to send the data stream to the busy destination too many times.

3. The method according to claim 2 further comprising dropping the data stream if the throttling action has been performed too many times.

4. The method according to claim 1 wherein determining if the destinations are busy includes determining the usage level of a central processing unit (CPU) at the destination.

5. The method according to claim 4 wherein determining if the destinations are busy includes determining that the destination is busy if its CPU usage level is 80% or above.

6. The method according to claim 1 wherein determining if the destinations are busy includes determining if a CPU within the source has too high of a usage level.

7. The method according to claim 1 wherein performing a throttling action includes waiting a predetermined period of time to send the data stream to the busy destination.

8. The method according to claim 7 wherein the predetermined period of time is about 20 milliseconds.

9. The method according to claim 1 wherein performing a throttling action includes sending the data stream to the busy destination at a slower rate.

10. The method according to claim 1 wherein the source is a master processor and the plurality of destinations are slave processors within a network router.

11. A method for controlling a stream of data sent from a source to a plurality of destinations, said method comprising:
    selecting which of the plurality of destinations a particular data stream is to be sent;
    determining if one or more of the selected destinations are busy;
    responsive to a determination that at least one of the selected destinations is not busy, sending the particular data stream to those selected destinations that are not busy;
    responsive to a determination that at least one of the selected destinations is busy, performing a throttling action for the particular data stream being sent to the busy destination so as to reduce the chance that the data stream will be dropped, wherein performing the throttling action includes waiting a predetermined period of time to send the data stream to the busy destination; and
    determining whether the throttling action has attempted to send the data stream to the busy destination too many times, and dropping the data stream if the throttling action has been performed too many times.

12. The method according to claim 11 wherein determining if the destinations are busy includes determining the usage level of a central processing unit (CPU) in the destination.

13. The method according to claim 12 wherein determining if the destinations are busy includes determining that the destination is busy if the CPU usage level is 80% or above.

14. The method according to claim 11 wherein determining if the destinations are busy includes determining if a CPU within the source has too high of a usage level.

15. The method according to claim 11 wherein the predetermined period of time is about 20 milliseconds.

16. The method according to claim 11 wherein the source is a master processor and the plurality of destinations are slave processors within a network router.

17. A system for controlling a stream of data from a source to a plurality of destinations, said system comprising:

means for selecting which of the plurality of destinations a particular data stream is to be sent;

means for determining if one or more of the selected destinations is busy;

means, responsive to a determination that at least one of the selected destinations is not busy, for sending the particular data stream to those selected destinations that are not busy; and means, responsive to a determination that at least one of the selected destinations is busy, for performing a throttling action for the particular data stream being sent to the busy destination so as to reduce the chance that the data stream will be dropped.

18. The system according to claim 17 further comprising means for determining whether the means for performing the throttling action has attempted to send the data stream to the busy destination too many times.

19. The system according to claim 18 further comprising means for dropping the data stream if the throttling action has been performed too many times.

20. The system according to claim 17 wherein the means for determining if the destinations are busy includes means for determining the usage level of a central processing unit (CPU) in the destination.

21. The system according to claim 20 wherein the means for determining if the destinations are busy determines that the destination is busy if the CPU usage level is 80% or above.

22. The system according to claim 17 wherein the means for determining if the destinations are busy includes means for determining if a CPU within the source has too high of a usage level.

23. The system according to claim 17 wherein the means for performing a throttling action includes means for waiting a predetermined period of time to send the data stream to the busy destination.

24. The system according to claim 23 wherein the predetermined period of time is about 20 milliseconds.

25. The system according to claim 17 wherein the means for performing a throttling action includes means for sending the data stream to the busy destination at a slower rate.

26. The system according to claim 17 wherein the source is a master processor and the plurality of destinations are slave processors within a network router.

* * * * *